United States Patent
Imada et al.

(10) Patent No.: US 11,827,801 B2
(45) Date of Patent: Nov. 28, 2023

(54) PRIMER FOR ETHYLENE/TETRAFLUOROETHYLENE COPOLYMER COATING MATERIALS

(71) Applicant: DAIKIN INDUSTRIES, LTD., Osaka (JP)

(72) Inventors: Hirotake Imada, Osaka (JP); Yasukazu Nakatani, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 14 days.

(21) Appl. No.: 17/532,461

(22) Filed: Nov. 22, 2021

(65) Prior Publication Data
US 2022/0081584 A1    Mar. 17, 2022

Related U.S. Application Data

(63) Continuation of application No. PCT/JP2020/017224, filed on Apr. 21, 2020.

(30) Foreign Application Priority Data

May 31, 2019 (JP) .................. 2019-102787

(51) Int. Cl.
| | |
|---|---|
| C09D 127/18 | (2006.01) |
| C09D 5/00 | (2006.01) |
| C09D 7/20 | (2018.01) |
| C09D 7/63 | (2018.01) |
| C09D 7/65 | (2018.01) |

(52) U.S. Cl.
CPC ........... *C09D 127/18* (2013.01); *C09D 5/002* (2013.01); *C09D 7/20* (2018.01); *C09D 7/63* (2018.01); *C09D 7/65* (2018.01)

(58) Field of Classification Search
None
See application file for complete search history.

(56) References Cited

U.S. PATENT DOCUMENTS

| | | | |
|---|---|---|---|
| 2004/0147666 A1* | 7/2004 | Tomihashi | C09D 127/18 524/545 |
| 2014/0378584 A1* | 12/2014 | Reynolds | C09D 7/20 524/99 |
| 2016/0222220 A1* | 8/2016 | Hoshikawa | C09D 163/00 |
| 2017/0088651 A1 | 3/2017 | Aida et al. | |
| 2018/0037765 A1 | 2/2018 | Tamura et al. | |

FOREIGN PATENT DOCUMENTS

| | | |
|---|---|---|
| CN | 107406719 A | 11/2017 |
| CN | 109608951 A | 4/2019 |
| TW | 201605910 A | 2/2016 |
| WO | 02/090450 A1 | 11/2002 |

OTHER PUBLICATIONS

International Preliminary Report on Patentability dated Nov. 16, 2021 with a Translation of the Written Opinion of the International Searching Authority in Application No. PCT/JP2020/017224.
International Search Report for PCT/JP2020/017224 dated Aug. 4, 2020 [PCT/ISA/210].
Extended European Search Report dated May 12, 2023 in counterpart European Application No. 20812998.1.

* cited by examiner

*Primary Examiner* — Ramsey Zacharia
(74) *Attorney, Agent, or Firm* — Sughrue Mion, PLLC

(57) ABSTRACT

A primer for an ETFE coating material containing: ethylene/tetrafluoroethylene copolymer (ETFE) particles; a heat-resistant resin; and a nonionic surfactant. The ETFE particles have an average particle size of 5.0 to 50 μm. The heat-resistant resin includes at least one selected from polyamide-imide resin, polyethersulfone resin, and polyimide resin. The ETFE particles and the heat-resistant resin have a solid content ratio by mass of 60:40 to 90:10. The nonionic surfactant includes a polyoxyethylene alkyl ether surfactant. Also disclosed is a primer film obtained from the primer for an ETFE coating material as well as a coated article.

9 Claims, No Drawings

PRIMER FOR ETHYLENE/TETRAFLUOROETHYLENE COPOLYMER COATING MATERIALS

CROSS REFERENCE TO RELATED APPLICATIONS

This application is a Rule 53(b) Continuation of International Application No. PCT/JP2020/017224 filed Apr. 21, 2020, claiming priority based on Japanese Patent Application No. 2019-102787 filed May 31, 2019, the respective disclosures of which are incorporated herein by reference in their entirety.

TECHNICAL FIELD

The disclosure relates to primers for ethylene/tetrafluoroethylene copolymer coating materials.

BACKGROUND ART

Ethylene/tetrafluoroethylene copolymers (ETFE) are used in various materials including molding materials and coating materials owing to their excellent properties such as corrosion resistance and heat resistance. The coating materials are often powdery coating materials. Adhesion of such an ETFE coating material to a subject to be coated is studied for improvement.

Patent Literature 1 discloses a primer for an ETFE coating material containing ETFE (A) particles having a specific average particle size, a specific heat-resistant resin, and a heat-resistant-resin-dissolving solvent, in which the ETFE (A) particles and the heat-resistant resin have a solid content ratio within a specific range.

CITATION LIST

Patent Literature

Patent Literature 1: WO 2002/090450

SUMMARY

The disclosure relates to a primer for an ETFE coating material containing: ethylene/tetrafluoroethylene copolymer (ETFE) particles; a heat-resistant resin; and a nonionic surfactant, the ETFE particles having an average particle size of 5.0 to 50 μm, the heat-resistant resin including at least one selected from the group consisting of polyamide-imide resin, polyethersulfone resin, and polyimide resin, the ETFE particles and the heat-resistant resin having a solid content ratio by mass of 60:40 to 90:10, the nonionic surfactant including a polyoxyethylene alkyl ether surfactant.

Advantageous Effects

The disclosure can provide a primer for an ETFE coating material capable of providing a primer film excellent in adhesion to a subject to be coated and to an ETFE film.

DESCRIPTION OF EMBODIMENTS

The disclosure will be specifically described hereinbelow.

The disclosure relates to a primer for an ETFE coating material containing ethylene/tetrafluoroethylene copolymer (ETFE) particles, a heat-resistant resin, and a nonionic surfactant, the ETFE particles having an average particle size of 5.0 to 50 μm, the heat-resistant resin including at least one selected from the group consisting of polyamide-imide resin, polyethersulfone resin, and polyimide resin, the ETFE particles and the heat-resistant resin having a solid content ratio by mass of 60:40 to 90:10, the nonionic surfactant including a polyoxyethylene alkyl ether surfactant.

The primer for an ETFE coating material of the disclosure is capable of providing a primer film excellent in adhesion to a subject to be coated (substrate) and to an ETFE film.

The ETFE particles have an average particle size of 5.0 to 50 μm. Too small an average particle size may cause easy cracking of the resulting primer film. In such a case, a thick primer film may be difficult to form. Too large an average particle size may not allow uniform dispersion of ETFE (A) in the primer film to lower the adhesion of the primer film to an ETFE film formed on the primer film. The lower limit of the average particle size is preferably 8 μm, more preferably 15 μm. The upper limit is preferably 35 μm.

The average particle size is a value determined by a laser diffraction method.

ETFE constituting the ETFE particles (hereafter, also referred to as ETFE (A)) preferably has a melt flow rate (MFR) of 0.1 to 100 g/10 min. When the melt flow rate is within the above range, the adhesion between the resulting primer film and an ETFE film is further improved owing to the flow characteristics of the ETFE (A). In addition, the primer film is less likely to suffer stress cracks, leading to higher corrosion resistance. The lower limit of the melt flow rate is more preferably 0.5 g/10 min and the upper limit thereof is more preferably 50 g/10 min. Adjustment of the copolymerization composition described later and the molecular weight enables the ETFE (A) to have a melt flow rate within the above range.

The melt flow rate herein is a value determined at a temperature of 297° C. under a load of 5 kg in conformity with ASTM D3159.

The ETFE (A) preferably has a melting point of 200° C. or higher. The ETFE (A) having a melting point within the above range is not likely to cause deformation of the primer film when used at high temperature and thus has higher heat resistance. The melting point is more preferably higher than 200° C., still more preferably 215° C. or higher. The upper limit of the melting point may be, but not limited to, 220° C., 250° C., or 280° C.

The melting point is the temperature at the peak on an endothermic curve obtained by thermal analysis at a temperature-increasing rate of 10° C./min using a differential scanning calorimeter in conformity with ASTM D-4591.

The ETFE (A) contains a polymerized unit (a) based on ethylene and a polymerized unit (b) based on tetrafluoroethylene (TFE).

The polymerized unit (a) based on ethylene represents a repeating unit represented by —$CH_2CH_2$—. The polymerized unit (b) based on TFE represents a repeating unit represented by —$CF_2CF_2$—.

In the ETFE (A), the polymerized unit (a) and the polymerized unit (b) preferably have a mole ratio (a)/(b) of 20/80 to 80/20. The mole ratio within the above range improves the productivity and corrosion resistance. The upper limit of the mole ratio is more preferably 60/40. The mole ratio within this range further improves the corrosion resistance.

The ETFE (A) may consist of the polymerized unit (a) and the polymerized unit (b) or contain a polymerized unit (c) based on a third component together with the polymerized unit (a) and the polymerized unit (b). The third component may be any monomer copolymerizable with ethylene and TFE. Preferably, the third component is a monomer containing a terminal carbon-carbon double bond.

The polymerized unit (c) based on a third component represents a structure derived from the third component (monomer) that is copolymerized into a polymer to serve as a part of the polymer structure.

Examples of the third component include vinylidene fluoride, chlorotrifluoroethylene, vinyl fluoride, hexafluoropropylene, hexafluoroisobutene, (fluoroalkyl)ethylene represented by the formula (A1):

$$CH_2=CXY \quad (A1)$$

(wherein X is a hydrogen atom or a fluorine atom; and Y is a fluoroalkyl group), perfluoro(alkyl vinyl ether) represented by the formula (B):

$$CF_2=CF-ORf^1 \quad (B)$$

(wherein $Rf^1$ is a C1-C8 perfluoroalkyl group), and an alkyl perfluorovinyl ether derivative represented by the formula (C):

$$CF_2=CF-OCH_2-Rf^2 \quad (C)$$

(wherein $Rf^2$ is a C1-C5 perfluoroalkyl group).

Y in the formula (A1) is a fluoroalkyl group. The fluoroalkyl group may be either linear or branched. The fluoroalkyl group preferably has a carbon number of 2 to 10, more preferably 2 to 8, still more preferably 2 to 6.

The monomer represented by the formula (A1) is preferably a monomer represented by the following formula (A2):

$$CH_2=CX-(CF_2)_nZ \quad (A2)$$

wherein X and Z are the same as or different from each other and are each a hydrogen atom or a fluorine atom; and n is an integer of 2 to 8.

In the formula (A2), n is an integer of 2 to 8, preferably an integer of 2 to 6, more preferably an integer of 2 to 4, still more preferably 3.

Examples of the monomer represented by the formula (A2) include $CH_2=CF(CF_2)_2F$, $CH_2=CF(CF_2)_3F$, $CH_2=CF(CF_2)_4F$, $CH_2=CF(CF_2)_2H$, $CH_2=CF(CF_2)_3H$, $CH_2=CF(CF_2)_4H$, $CH_2=CH(CF_2)_2F$, $CH_2=CH(CF_2)_3F$, $CH_2=CH(CF_2)_4F$, $CH_2=CH(CF_2)_6F$, $CH_2=CH(CF_2)_2H$, $CH_2=CH(CF_2)_3H$, and $CH_2=CH(CF_2)_4H$.

The monomer represented by the formula (A2) preferably includes at least one selected from the group consisting of $CH_2=CF(CF_2)_3H$, $CH_2=CH(CF_2)_3F$, $CH_2=CF(CF_2)_4H$, $CH_2=CH(CF_2)_4F$, $CH_2=CF(CF_2)_5H$, $CH_2=CH(CF_2)_5F$, $CH_2=CF(CF_2)_6H$, and $CH_2=CH(CF_2)_6F$, more preferably includes at least one selected from the group consisting of $CH_2=CF(CF_2)_3H$, $CH_2=CH(CF_2)_6F$, and $CH_2=CH(CF_2)_4F$, still more preferably is $CH_2=CF(CF_2)_3H$.

The third component preferably includes at least one selected from the group consisting of (fluoroalkyl)ethylene represented by the formula (A1), perfluoro(alkyl vinyl ether) represented by the formula (B), and an alkyl perfluorovinyl ether derivative represented by the formula (C), more preferably is (fluoroalkyl)ethylene represented by the formula (A1), still more preferably includes at least one selected from the group consisting of $CH_2=CF(CF_2)_3H$, $CH_2=CH(CF_2)_6F$, and $CH_2=CH(CF_2)_4F$.

In the ETFE (A), the proportion of the polymerized unit (c) based on a third component is preferably 0 to 10 mol %, preferably 0.1 to 10 mol %, more preferably 0.1 to 5 mol %, particularly preferably 0.2 to 4 mol % relative to all the polymerized units in the ETFE (A).

In the description, the amounts of the monomer units are values determined by $^{19}$F-NMR analysis.

The ETFE (A) is obtainable, for example, by copolymerization by a conventionally known polymerization method such as emulsion polymerization. ETFE powder obtained by copolymerization is optionally pulverized to have an average particle size within the range described above. The pulverization may be performed by any method such as a conventionally known method disclosed in JP S63-270740 A. In an exemplary method, the ETFE powder is compressed by a roller into a sheet, pulverized using a pulverizer, and classified. The ETFE (A) obtained by emulsion polymerization or suspension polymerization may be used in the form of a dispersion without being subjected to isolation of the obtained resin component as long as the conditions described above are satisfied.

The primer for an ETFE coating material of the disclosure contains a heat-resistant resin. The heat-resistant resin includes at least one selected from the group consisting of polyamide-imide resin (PAI), polyethersulfone resin (PES), and polyimide resin (PI). The heat-resistant resin is preferably PAI among these.

PAI is a resin constituted by a polymer containing an amide bond and an imide bond in the molecular structure. The PAI is not limited, and examples thereof include resins constituted by high-molecular-weight polymers obtainable by various reactions including: a reaction between an aromatic diamine containing an amide bond in the molecule and an aromatic tetravalent carboxylic acid (e.g., pyromellitic acid); a reaction between an aromatic trivalent carboxylic acid (e.g., trimellitic anhydride) and a diamine (e.g., 4,4-diaminophenyl ether) or a diisocyanate (e.g., diphenylmethane diisocyanate); a reaction between a dibasic acid containing an aromatic imide ring in the molecule and a diamine. In order to achieve excellent heat resistance, the PAI is preferably constituted by a polymer containing an aromatic ring in the backbone.

PES is a resin constituted by a polymer containing a repeating unit represented by the following formula.

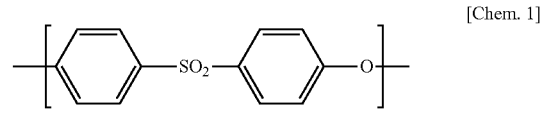

[Chem. 1]

The PES is not limited, and examples thereof include a resin constituted by a polymer obtainable by polycondensation of a dichlorodiphenyl sulfone and a bisphenol.

PI is a resin constituted by a polymer containing an imide bond in the molecular structure. The PI is not limited, and examples thereof include a resin constituted by a high-molecular-weight polymer obtainable by a reaction of an aromatic tetravalent carboxylic anhydride (e.g., pyromellitic anhydride) or like reactions. In order to achieve excellent heat resistance, the PI is preferably constituted by a polymer containing an aromatic ring in the backbone.

The ETFE particles and the heat-resistant resin have a solid content ratio by mass of 60:40 to 90:10. Too small an ETFE particle content may lower the adhesion between the resulting primer film and an ETFE film, possibly causing interlayer peeling. Too large an ETFE particle content may lower the adhesion between the primer film and a subject to be coated. The lower limit of the mass ratio is preferably 70:30, more preferably 76:24. The upper limit thereof is preferably 85:15.

The primer for an ETFE coating material of the disclosure contains a nonionic surfactant. The nonionic surfactant includes a polyoxyethylene alkyl ether surfactant. The polyoxyethylene alkyl ether surfactant is easily pyrolyzed to hardly remain in the film after firing. Such a surfactant is not likely to disturb the adhesion effect attributable to the ETFE particles and the heat-resistant resin in the resulting primer film. The adhesion of the primer film to the subject to be coated and to the ETFE film is thus improved.

The polyoxyethylene alkyl ether surfactant is preferably, for example, a surfactant represented by the formula:

wherein R is a linear or branched C5-C18 alkyl group and A is a polyoxyethylene chain containing 5 to 20 oxyethylene groups.

The alkyl group for R has a carbon number of preferably 10 to 16. Examples of the alkyl group include linear or branched decyl, lauryl, tridecyl, cetyl, and stearyl groups.

The polyoxyethylene chain preferably contains 7 to 15 oxyethylene groups.

Preferred is a polyoxyethylene alkyl ether surfactant in which R is a C10-C16 alkyl group and the polyoxyethylene chain contains 7 to 15 oxyethylene groups for its excellent surfactant performance, water solubility, and easy availability. The raw materials of this surfactant may include natural or synthetic higher alcohols but preferably include no alkylphenols.

The amount of the polyoxyethylene alkyl ether surfactant is preferably 1.0 to 20.0% by mass relative to the ETFE particles. The amount is more preferably 3.0% by mass or more, still more preferably 5.0% by mass or more. The amount is more preferably 15.0% by mass or less, still more preferably 10.0% by mass or less.

In the primer for an ETFE coating material of the disclosure, the amount of alkylphenols relative to the primer for an ETFE coating material is preferably 0.10 ppm by mass or less, more preferably 0.05 ppm by mass or less, still more preferably less than 0.05 ppm by mass.

The amount of alkylphenols is a value determined by liquid chromatography.

The primer for an ETFE coating material of the disclosure may further contain a dispersion medium. In this case, the primer may be a dispersion containing the ETFE particles dispersed as a dispersoid in the dispersion medium. When the primer contains the dispersion medium, the ETFE particles can be applied throughout the subject to be coated.

The dispersion medium preferably includes at least one selected from the group consisting of water, an alcohol, a ketone, an ester, and an aromatic hydrocarbon. The dispersion medium is particularly preferably water because water is preferable in terms of the working environment.

In the case where the dispersion medium used is water, a rust inhibitor may be added in order to prevent corrosion of the subject to be coated upon application. The rust inhibitor is not limited, and may be, for example dibutylamine or the like.

In the case where the ETFE particles obtained by emulsion polymerization are used in the form of a dispersion without being isolated, water used in the emulsion polymerization may be used as the dispersion medium. In this case, additional water may be used. In the case where the ETFE particles are obtained by suspension polymerization, similarly, the solvent used in the suspension polymerization may be used as the dispersion medium within the range of the dispersion medium mentioned above.

The primer for an ETFE coating material of the disclosure may further contain a heat-resistant-resin-dissolving solvent for dissolving the heat-resistant resin. In the case where the heat-resistant resin is dissolved in the heat-resistant-resin-dissolving solvent to be uniformly dispersed in the primer for an ETFE coating material, the heat-resistant resin can be spread throughout the subject to be coated by application, thereby improving the adhesion of the primer film to the subject to be coated.

The heat-resistant-resin-dissolving solvent used may be any solvent capable of dissolving the heat-resistant resin. Preferred is one having a boiling point at 1 atm of 100° C. or higher.

Examples of the heat-resistant-resin-dissolving solvent include N-ethyl-2-pyrrolidone, N-butyl-2-pyrrolidone, 3-alkoxy-N,N-dimethylpropane amide, dimethyl sulfoxide, 1,3-dimethyl-2-imidazolidinone, 3-methyl-2-oxazolidinone, N-formylmorpholine, N-acetylmorpholine, dimethylpropylene urea, anisole, diethyl ether, ethylene glycol, acetophenone, methyl ethyl ketone, methyl isobutyl ketone, cyclohexanone, cyclopentanone, xylene, toluene, ethanol, and 2-propanol. One or two or more of these may be used.

The heat-resistant-resin-dissolving solvent includes preferably at least one selected from the group consisting of N-ethyl-2-pyrrolidone, N-butyl-2-pyrrolidone, 3-alkoxy-N,N-dimethylpropane amide, dimethyl sulfoxide, 1,3-dimethyl-2-imidazolidinone, 3-methyl-2-oxazolidinone, N-formylmorpholine, N-acetylmorpholine, dimethylpropylene urea, anisole, diethyl ether, ethylene glycol, acetophenone, methyl ethyl ketone, methyl isobutyl ketone, cyclohexanone, cyclopentanone, xylene, toluene, ethanol, and 2-propanol, more preferably at least one selected from the group consisting of N-ethyl-2-pyrrolidone, N-butyl-2-pyrrolidone, 3-alkoxy-M,N-dimethylpropane amide, dimethyl sulfoxide, 1,3-dimethyl-2-imidazolidinone, 3-methyl-2-oxazolidinone, N-formylmorpholine, N-acetylmorpholine, and dimethylpropylene urea, still more preferably at least one selected from the group consisting of N-ethyl-2-pyrrolidone, N-butyl-2-pyrrolidone, 3-alkoxy-N,N-dimethylpropane amide, 1,3-dimethyl-2-imidazolidinone, 3-methyl-2-oxazolidinone, N-formylmorpholine, N-acetylmorpholine, and dimethylpropylene urea.

The 3-alkoxy-N,N-dimethylpropane amide is represented by $N(CH_3)_2COCH_2CH_2OR^{11}$ wherein $R^{11}$ is an alkyl group. The alkoxy group ($R^{11}O$ group) is not limited, and is preferably an alkoxy group containing a lower alkyl group having a carbon number of about 1 to 6, more preferably a methoxy group, an ethoxy group, a propoxy group, or a butoxy group. The 3-alkoxy-N,N-dimethylpropane amide is particularly preferably 3-methoxy-N,N-dimethylpropane amide ($N(CH_3)_2COCH_2CH_2OCH_3$).

The heat-resistant-resin-dissolving solvent is preferably present in an amount of 10% by mass or more relative to the heat-resistant resin. The amount within the above range further facilitates spreading of the heat-resistant resin throughout the subject to be coated, further promoting improvement of the adhesion of the primer film to the subject to be coated. The lower limit of the amount is more preferably 50% by mass. An increase in the amount of the heat-resistant-resin-dissolving solvent tends to improve the adhesion of the primer film to the subject to be coated. In consideration of the industrial production, the upper limit of the amount is preferably 500% by mass, more preferably 350% by mass.

The primer for an ETFE coating material of the disclosure contains N-methyl-2-pyrrolidone, N,N-dimethylacetamide, N,N-dimethylformamide, and γ-butyrolactone in a total amount of preferably less than 0.1% by mass relative to the primer for an ETFE coating material. The total amount is more preferably less than 0.01% by mass, still more preferably less than 0.001% by mass.

The total amount is a value determined by liquid chromatography.

The primer for an ETFE coating material of the disclosure is also preferably free from any of N-methyl-2-pyrrolidone, N,N-dimethylacetamide, N,N-dimethylformamide, and γ-butyrolactone.

The primer for an ETFE coating material of the disclosure may further contain a heat stabilizer. Containing the heat stabilizer, the primer for an ETFE coating material of the disclosure can prevent oxidation of the ETFE (A) and the heat-resistant resin due to heating or the like during ETFE film formation, thereby reducing thermal degradation. As a result, adhesion stability can be further improved.

Any heat stabilizer may be used. Preferred is, for example, a metal oxide, an amine antioxidant, an organic sulfur-containing compound, or the like.

The metal oxide may be any metal oxide that functions as a heat stabilizer. Examples thereof include oxides of typical metals such as Cu, Al, Fe, Co, and Zn.

The amine antioxidant is preferably an amine compound maintaining stability even at 250° C. or higher in consideration of the heating step described above. The amine compound may be, for example, an aromatic amine. Preferred examples thereof include amine derivatives containing a phenyl group or a naphthyl group such as dinaphthylamine, phenyl-α-naphthylamine, phenyl-β-naphthylamine, diphenyl-p-phenylenediamine, and phenylcyclohexyl-p-phenylenediamine.

The organic sulfur compound is not limited, and examples thereof include benzoimidazole mercaptan compounds, benzothiazole mercaptan compounds, thiocarbamic acid, salts of these, and thiuram monosulfide. The salts are not limited, and examples thereof include Zn salt, Sn salt, Cd salt, Cu salt, and Fe salt.

One or two or more heat stabilizers may be used.

In the case where the primer for an ETFE coating material of the disclosure is used in the fields where elution of metal ions is not desirable, such as the pharmaceutical field or the semiconductor field, the heat stabilizer is preferably a nonmetallic compound which does not produce residues. Examples thereof include those other than metal salts among amine antioxidants and organic sulfur compounds.

In the case where the primer for an ETFE coating material of the disclosure contains the heat stabilizer, the amount of the heat stabilizer is preferably 0.001 to 5% by mass relative to the solid content of the ETFE particles from the standpoint of achieving the thermal stability effect and preventing foaming caused by decomposition of the heat stabilizer. The lower limit of the amount is more preferably 0.003% by mass and the upper limit thereof is more preferably 2% by mass.

The primer for an ETFE coating material of the disclosure may further contain additives, if necessary. The additives are not limited, and examples thereof include those usable for common primers for coating materials. The additives may be, for example, pigments. The pigments are not limited, and examples thereof include coloring pigments such as carbon, titanium oxide, red iron oxide, and mica, as well as anticorrosive pigments and sintered pigments.

The primer for an ETFE coating material of the disclosure is prepared, for example, by a conventionally known method. In an exemplary method, the primer for an ETFE coating material of the disclosure is prepared by mixing the ETFE particles, the heat-resistant resin, the nonionic surfactant, and other materials such as the dispersion medium or the heat stabilizer, if necessary, optionally adding the heat-resistant-resin-dissolving solvent, and stirring them so that each material is dispersed.

The primer for an ETFE coating material of the disclosure may be for forming a primer film provided under an ETFE film, preferably for forming a primer film provided under an ETFE film to directly touch the ETFE film. Here, "under an ETFE film" means a space between the ETFE film and a subject to be coated (substrate). The ETFE film is described later.

The primer for an ETFE coating material of the disclosure is preferably directly applied to a subject to be coated.

The primer for an ETFE coating material of the disclosure is applied to a subject to be coated and subsequently undergoes drying or heating as appropriate. Thus, a primer film is formed.

The subject to be coated may be any subject on which an ETFE film can be formed.

Examples of the material of the subject to be coated include metals such as single metals (e.g., iron, aluminum, copper) and alloys of these (e.g., stainless steel (SUS)); nonmetallic inorganic materials such as enamel, glass, and ceramic; resins such as heat-resistant resins; and rubbers such as heat-resistant rubbers. Among these, preferred are metal and nonmetallic inorganic materials, and more preferred is metal.

The subject to be coated may be used for lining of pipes, tanks, vessels, towers, valves, pumps, and the like.

The subject to be coated may be preliminarily subjected to a surface treatment such as washing or sandblasting, if necessary. The sandblasting involves blasting sand such as silica sand or alumina powder to roughen the surface of the subject to be coated, and therefore is preferably performed in order to improve adhesion.

The primer for an ETFE coating material of the disclosure may be applied to the subject to be coated by any method appropriately selected in accordance with the form of the subject to be coated or the like. Examples of the method include conventionally known methods such as spray coating, immersion coating, brush coating, and electrostatic coating. The application may be performed to form a film having a dry thickness of 10 to 60 μm. The heating is preferably performed at, for example 60° C. to 120° C. The applied primer may be dried at room temperature prior to the heating. The drying can ease the heating condition.

The heating (and drying, if necessary) is also preferably performed at a temperature at which the ETFE (A) and the heat-resistant resin separate into layers.

The layer separation is considered to occur as follows. The heat-resistant resin enters among the ETFE (A) particles when dry to cause gradients in concentrations of them, and a difference in surface tension between the ETFE (A) and the heat-resistant resin promotes separation during firing to cause layer separation.

As a result of the layer separation, a heat-resistant resin layer is formed on the side close to the subject to be coated and an ETFE (A) layer is formed on the side farther from the subject to be coated. Of the primer film herein, a layer in which the heat-resistant resin is greater than the ETFE (A)

in terms of the solid content ratio by mass is referred to as a heat-resistant resin layer and a layer in which the ETFE (A) is greater than the heat-resistant resin in terms of the solid content ratio by mass is referred to as an ETFE (A) layer. The heat-resistant resin layer and the ETFE (A) layer may include a part having a concentration gradient. The boundary between the layers may not be clear. Both the ETFE (A) layer and the heat-resistant resin layer may constitute the primer film.

As a result of the layer separation, the ETFE film described above is brought into contact with the upper surface of the ETFE (A) layer. Because both the ETFE (A) layer and the ETFE film contain ETFE, the adhesion between the primer film and the ETFE film becomes further excellent. Moreover, as a result of the layer separation, the subject to be coated is brought into contact with the heat-resistant resin layer to further improve the adhesion between the primer film and the subject to be coated.

The disclosure also relates to a primer film obtainable from the primer for an ETFE coating material of the disclosure.

The primer film of the disclosure is excellent in adhesion to a subject to be coated and to an ETFE film.

In the primer film of the disclosure, the amount of alkylphenols relative to the primer film is preferably 0.10 ppm by mass or less, more preferably 0.05 ppm by mass or less, still more preferably less than 0.05 ppm by mass.

The amount of alkylphenols is a value determined by liquid chromatography.

To the primer film is applied an ETFE coating material, and subsequently subjected to heating by firing. Thus, an ETFE film can be formed.

The ETFE coating material is a coating material containing ETFE. The ETFE coating material is not limited and may appropriately contain other components such as additives, if necessary. Yet, the ETFE coating material preferably mainly contains ETFE (containing ETFE as a component with the largest content in the solid content). The ETFE coating material is preferably a powdery coating material. The powdery coating material may be produced by any method including a conventionally known method. Examples of the method include a method in which ETFE and other components are optionally melt-kneaded and then pulverized and a method in which ETFE and other components are pulverized and classified by the pulverization method of the ETFE (A) described above.

The ETFE in the ETFE coating material may be common ETFE and is conceptually differentiated from the ETFE (A), which is one component of the primer for an ETFE coating material of the disclosure. The ETFE in the ETFE coating material is not limited, and may be the same as or different from the ETFE (A) in terms of the ratio of ethylene and tetrafluoroethylene as monomer components, the type or copolymerization ratio of other monomer components optionally contained, the melt flow rate, the average particle size, and other characteristics. In order to improve the adhesion between the primer film and the ETFE film, the ETFE is preferably the same as or similar to the ETFE (A).

The ETFE coating material may be applied by any method. Examples of the method include electrostatic coating and rotolining. The temperature for the heating and firing is, for example, 250° C. to 350° C. or the like.

The disclosure also relates to a coated article including a subject to be coated, the primer film of the disclosure on the subject to be coated, and an ETFE film on the primer film.

The coated article of the disclosure is excellent in adhesion of the primer film to the subject to be coated and to the ETFE film.

The subject to be coated, the primer film, and the ETFE film are as described above.

In the coated article of the disclosure, the subject to be coated and the primer film are preferably in direct contact with each other. Also, the primer film and the ETFE film are preferably in direct contact with each other. Another layer may be further provided on the ETFE film. Yet, the ETFE film is preferably the outermost layer.

Available applications of the primer for an ETFE coating material of the disclosure, the primer film of the disclosure, and the coated article of the disclosure are not limited. Examples of the applications include those utilizing the properties of ETFE such as corrosion resistance, heat resistance, non-stickiness, and slidability. Examples of the applications include: cooking utensils including frying pans, pressure cookers, pots, grill pots, rice kettles, ovens, electric griddles, bread pans, kitchen knives, gas table stoves and the like; kitchen supplies including electric dispensing pots, ice trays, molds, extractor hoods and the like; parts used in the food industry such as kneading rolls, rolling mill rolls, conveyers, hoppers and the like; industrial goods such as rolls for office automation (OA), belts for OA, separation claws for OA, paper-making rolls, calender rolls for film production and the like; molds and templates including injection molds, molds and templates for molding foam polystyrene and the like; mold release devices such as release plates used in plywood/veneer production and the like; containers for industrial use (in particular, for the semiconductor industry); tools including saws, files and the like; household devices including clothes irons, scissors, knives and the like; metal foil; electric cables; sliding bearings used in machines including food processing machines, packaging machines, spinning machines and the like; sliding parts in cameras and clocks/watches; automobile parts including pipes, valves, bearings and the like; snow plow shovels; harrows; chutes; and anticorrosive applications for stirring blades, inside surfaces of tanks, vessels, towers, centrifugal machines and the like.

The disclosure relates to a primer for an ETFE coating material containing: ethylene/tetrafluoroethylene copolymer (ETFE) particles; a heat-resistant resin; and a nonionic surfactant, the ETFE particles having an average particle size of 5.0 to 50 μm, the heat-resistant resin including at least one selected from the group consisting of polyamide-imide resin, polyethersulfone resin, and polyimide resin, the ETFE particles and the heat-resistant resin having a solid content ratio by mass of 60:40 to 90:10, the nonionic surfactant including a polyoxyethylene alkyl ether surfactant.

Preferably, the primer for an ETFE coating material further contains at least one dispersion medium selected from the group consisting of water, an alcohol, a ketone, an ester, and an aromatic hydrocarbon.

Preferably, the primer for an ETFE coating material contains no or less than 0.1% by mass in total of N-methyl-2-pyrrolidone, N,N-dimethylacetamide, N,N-dimethylformamide, and γ-butyrolactone.

Preferably, the primer for an ETFE coating material further contains a heat-resistant-resin-dissolving solvent for dissolving the heat-resistant resin, and the heat-resistant-resin-dissolving solvent is present in an amount of 10% by mass or more relative to the heat-resistant resin.

Preferably, ETFE constituting the ETFE particles contains a polymerized unit (a) based on ethylene, a polymerized unit (b) based on tetrafluoroethylene, and a polymerized unit (c) based on a third component, and the third component includes at least one selected from the group consisting of $CH_2=CF(CF_2)_3H$, $CH_2=CH(CF_2)_6F$, and $CH_2=CH(CF_2)_4F$.

Preferably, ETFE constituting the ETFE particles has a melt flow rate of 0.1 to 100 g/10 min.

Preferably, the primer for an ETFE coating material further contains a heat stabilizer in an amount of 0.001 to 5% by mass relative to a solid content of the ETFE particles.

The disclosure also relates to a primer film obtainable from the primer for an ETFE coating material.

The disclosure also relates to a coated article including:
a subject to be coated;
the primer film on the subject to be coated; and
an ETFE film on the primer film.

EXAMPLES

The disclosure is more specifically described with reference to, but not limited to, the following examples.

Example 1

A stainless container was charged with 33.0 g of an ETFE powder (melt flow rate at 297° C.: 8 g/10 min, average particle size: 10 μm) having a mole ratio ethylene/tetrafluoroethylene/$CH_2=CFC_3F_6H$ of 33/65/2, 10.0 g of a PAI powder having an average particle size of 1.5 μm which was pulverized polyamide imide (PAI, available from Hitachi Chemical Co., Ltd.) as a heat-resistant resin, 2.90 g of a polyoxyethylene alkyl ether surfactant, 0.1 g of dibutylamine, and 25.0 g of pure water. The contents were stirred well at 300 rpm for 20 minutes using a propeller agitator, and 20.0 g of N-methyl-2-pyrrolidone was added thereto under stirring to be well dispersed. Thus, a primer for an ETFE coating material was obtained.

Example 2

A primer for an ETFE coating material was obtained as in Example 1, except that N-methyl-2-pyrrolidone was replaced by N-ethyl-2-pyrrolidone.

Example 3

A primer for an ETFE coating material was obtained as in Example 1, except that the amount of the ETFE powder was changed to 36.1 g and the amount of the PAI powder was changed to 6.9 g.

Example 4

A primer for an ETFE coating material was obtained as in Example 1, except that the heat-resistant resin used was changed from the polyamide imide to a PES powder having an average particle size of 5.0 μm which was pulverized polyether sulfone (PES, available from Sumitomo Chemical Co., Ltd.).

Example 5

A primer for an ETFE coating material was obtained as in Example 1, except that the heat-resistant resin used was changed from the polyamide imide to a PI powder having an average particle size of 8.0 μm which was pulverized polyimide (PI, available from Mitsubishi Gas Chemical Company).

Example 6

A primer for an ETFE coating material was obtained as in Example 1, except that the amount of the polyoxyethylene alkyl ether surfactant was changed to 6.0 g.

Comparative Example 1

A primer for an ETFE coating material was obtained as in Example 1, except that the polyoxyethylene alkyl ether surfactant was replaced by a polyoxyethylene alkyl phenyl ether surfactant (Triton X-100, available from Sigma-Aldrich Japan).

Comparative Example 2

A primer for an ETFE coating material was obtained as in Example 1, except that the amount of the ETFE powder was changed to 41.0 g and the amount of the PAI powder was changed to 2.0 g.

Comparative Example 3

A primer for an ETFE coating material was obtained as in Example 1, except that the amount of the ETFE powder was changed to 22.0 g and the amount of the PAI powder was changed to 21.0 g.

<Evaluation Method>
Adhesion Test of Primer for an ETFE Coating Material

To a degreased iron substrate (100 mm×200 mm×5 mm) was blasted Tosa Emery (available from Ujiden Chemical Industry Co., Ltd.) as 80 mesh alumina at a pressure of 0.5 MPa. After removal of the blasting powder with air, to the surface was sprayed the primer for an ETFE coating material obtained above to a dry thickness of 15 to 20 μm, followed by drying at 80° C. for 30 minutes. Then, the resulting surface was electrostatically coated with a powdery coating material (melt flow rate at 297° C.: 8 g/10 min, average particle size: 60 μm) containing ethylene/tetrafluoroethylene/hexafluoroisobutylene at a mole ratio of 33/65/2, followed by firing at 300° C. for 30 minutes. Thus, a coated article including a film having a thickness of about 800 μm was obtained. The film was striated with a knife every 10 mm wide, and a 90-degree peeling test was performed thereon at a speed of 50 mm/min using an autograph DSC-500 available from Shimadzu Corporation. Separately, the coated article immersed in boiling water at 98° C. for 72 hours was subjected to a peeling test under the same conditions. Table 1 shows the results.

TABLE 1

| | Adhesion force (kg/cm) in 90° peeling test | |
| --- | --- | --- |
| | Initial value | 98° C. hot water for 72 hours |
| Example 1 | 14 | 11 |
| Example 2 | 14 | 12 |
| Example 3 | 15 | 13 |
| Example 4 | 14 | 11 |
| Example 5 | 14 | 10 |
| Example 6 | 14 | 10 |
| Comparative Example 1 | 14 | 9 |

TABLE 1-continued

| | Adhesion force (kg/cm) in 90° peeling test | |
|---|---|---|
| | Initial value | 98° C. hot water for 72 hours |
| Comparative Example 2 | 7 | 2 |
| Comparative Example 3 | 9 | 3 |

The invention claimed is:

1. A primer for an ETFE coating material comprising:
ethylene/tetrafluoroethylene copolymer (ETFE) particles;
a heat-resistant resin; and
a nonionic surfactant,
the ETFE particles having an average particle size of 5.0 to 50 μm,
the heat-resistant resin including at least one selected from the group consisting of polyamide-imide resin, polyethersulfone resin, and polyimide resin,
the ETFE particles and the heat-resistant resin having a solid content ratio by mass of 60:40 to 90:10,
the nonionic surfactant including a polyoxyethylene alkyl ether surfactant.

2. The primer for an ETFE coating material according to claim 1, further comprising at least one dispersion medium selected from the group consisting of water, an alcohol, a ketone, an ester, and an aromatic hydrocarbon.

3. The primer for an ETFE coating material according to claim 1,
wherein the primer for an ETFE coating material contains no or less than 0.1% by mass in total of N-methyl-2-pyrrolidone, N,N-dimethylacetamide, N,N-dimethylformamide, and γ-butyrolactone relative to the primer for an ETFE coating material.

4. The primer for an ETFE coating material according to claim 1, further comprising a heat-resistant-resin-dissolving solvent for dissolving the heat-resistant resin,
wherein the heat-resistant-resin-dissolving solvent is present in an amount of 10% by mass or more relative to the heat-resistant resin.

5. The primer for an ETFE coating material according to claim 1,
wherein ETFE constituting the ETFE particles contains a polymerized unit (a) based on ethylene, a polymerized unit (b) based on tetrafluoroethylene, and a polymerized unit (c) based on a third component, and
the third component includes at least one selected from the group consisting of $CH_2=CF(CF_2)_3H$, $CH_2=CH(CF_2)_6F$, and $CH_2=CH(CF_2)_4F$.

6. The primer for an ETFE coating material according to claim 1,
wherein ETFE constituting the ETFE particles has a melt flow rate of 0.1 to 100 g/10 min.

7. The primer for an ETFE coating material according to claim 1, further comprising a heat stabilizer in an amount of 0.001 to 5% by mass relative to a solid content of the ETFE particles.

8. A primer film obtained from the primer for an ETFE coating material according to claim 1.

9. A coated article comprising:
a subject to be coated;
the primer film according to claim 8 on the subject to be coated; and
an ETFE film on the primer film.

* * * * *